Dec. 14, 1954

D. M. McBEAN ET AL 2,696,776

MACHINE FOR FILLING CANS

Filed April 24, 1951

INVENTOR.
DOUGLAS M. McBEAN
AND LAURENCE C. TALLMAN
BY

ATTORNEY

Dec. 14, 1954  D. M. McBEAN ET AL  2,696,776
MACHINE FOR FILLING CANS
Filed April 24, 1951  5 Sheets-Sheet 2
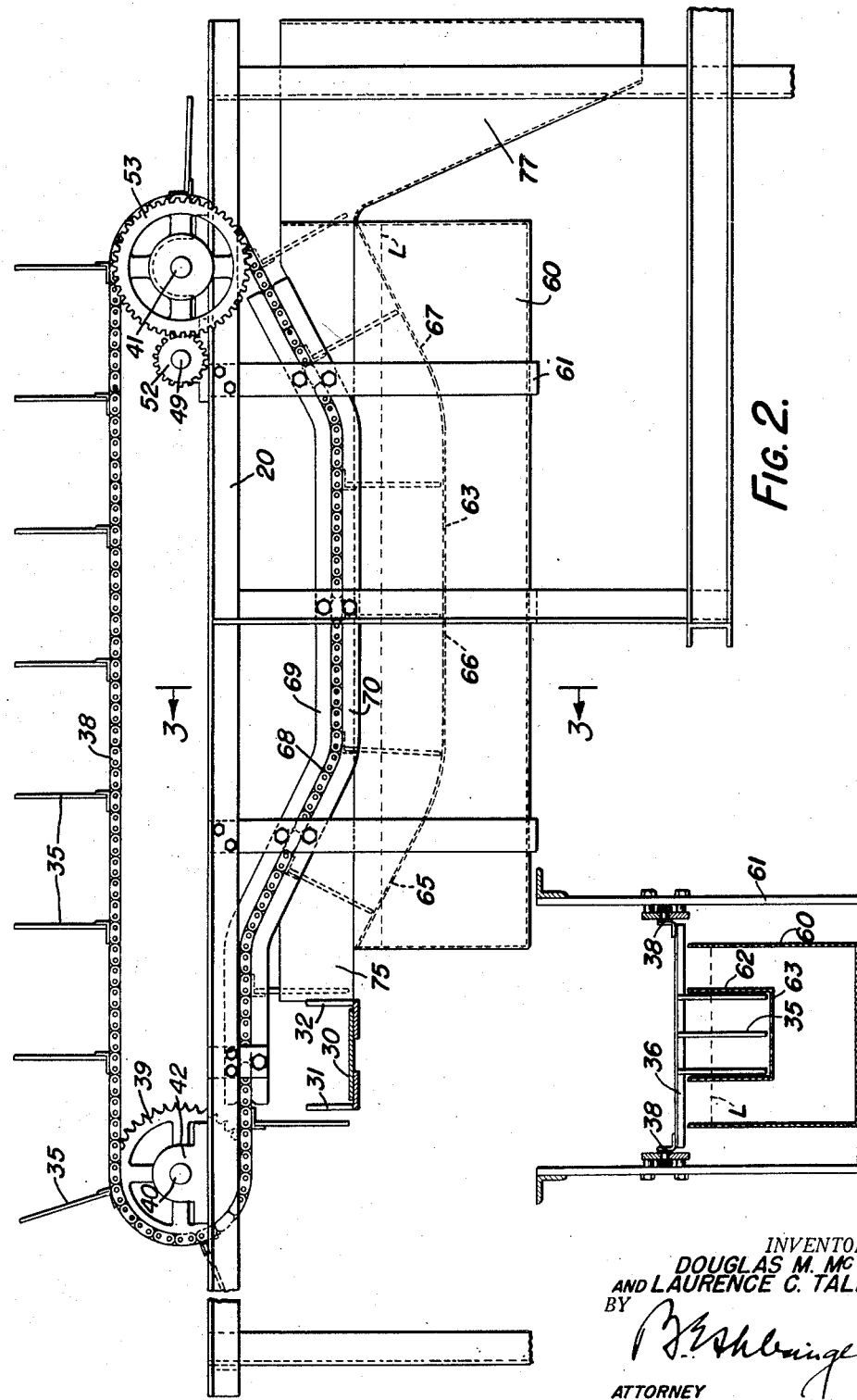
INVENTOR.
DOUGLAS M. McBEAN
AND LAURENCE C. TALLMAN
BY
ATTORNEY

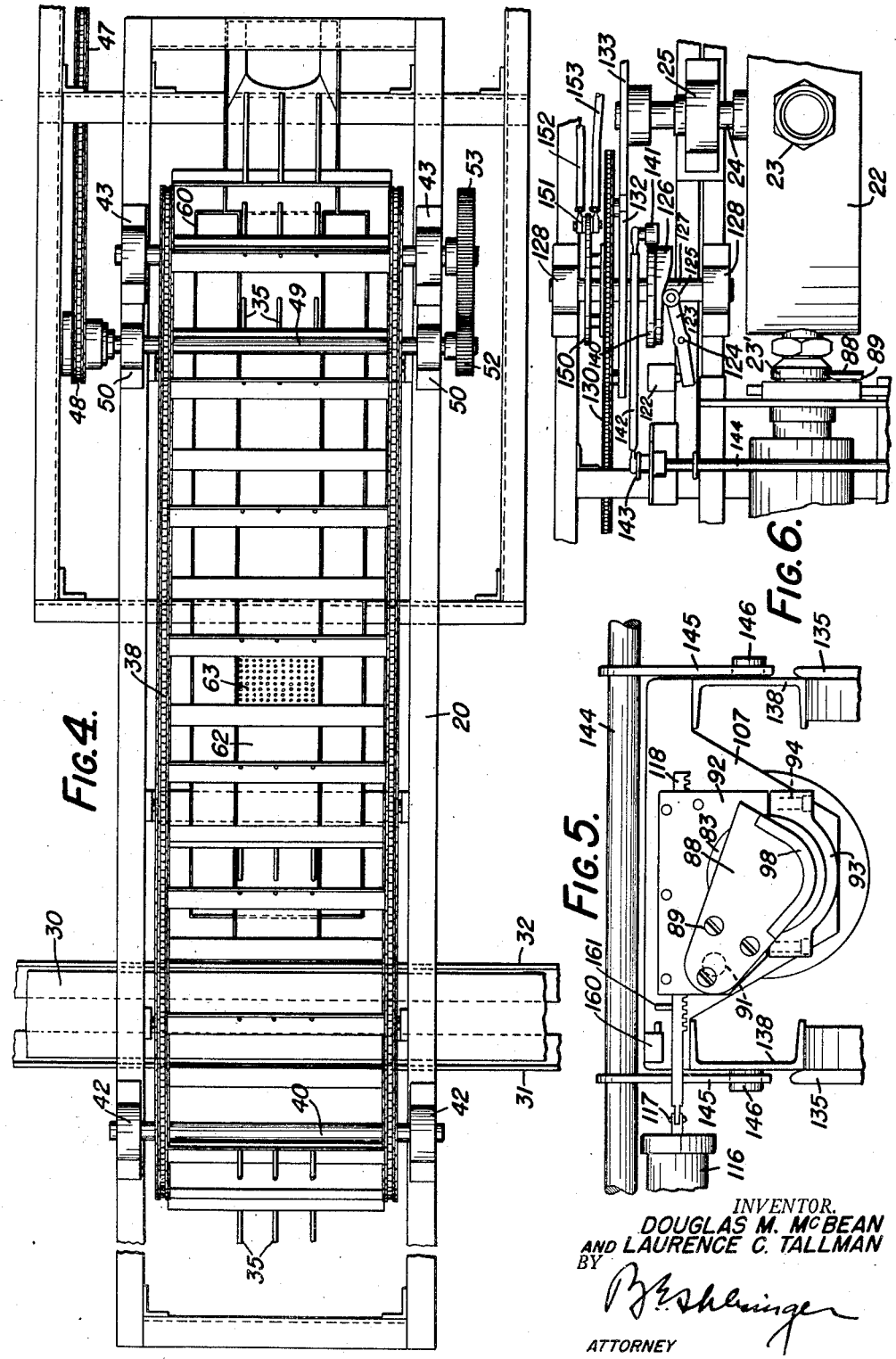

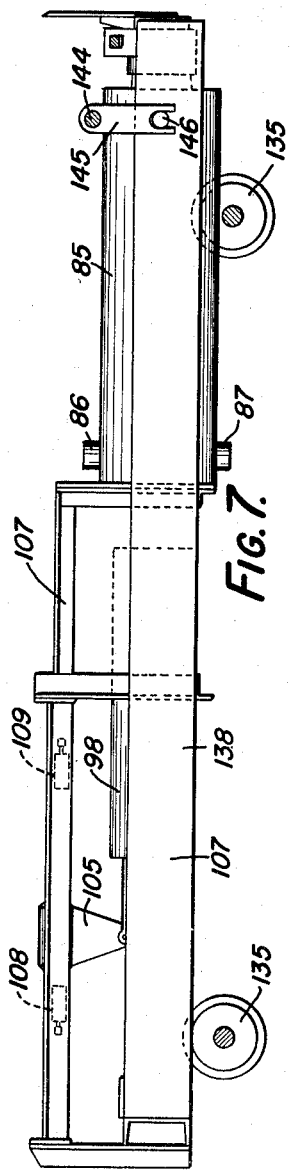
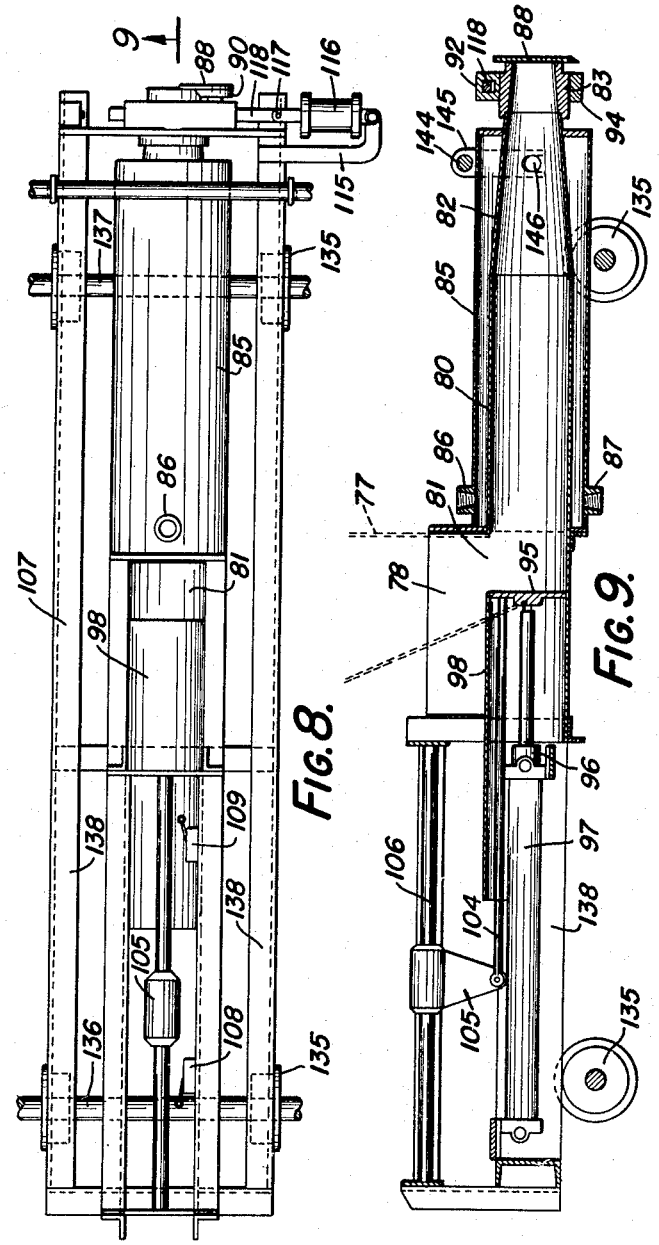

INVENTOR.
DOUGLAS M. McBEAN
AND LAURENCE C. TALLMAN
ATTORNEY

United States Patent Office 2,696,776
Patented Dec. 14, 1954

2,696,776

MACHINE FOR FILLING CANS

Douglas M. McBean, Rochester, and Laurence C. Tallman, Churchville, N. Y., assignors to McBean Research Corporation, Rochester, N. Y., a corporation of New York Application April 24, 1951, Serial No. 222,665

13 Claims. (Cl. 99—356)

The present invention relates to loading or filling machinery and particularly to machinery for filling foodstuffs into cans. In a more specific aspect the invention relates to machinery for filling cans with sauerkraut, spaghetti, or similar foods, and the present application is for the improvement on the machine of the McBean et al. U. S. patent application Serial No. 74,594, filed February 4, 1949, now Patent No. 2,621,844, issued December 16, 1952.

In the machine disclosed in the McBean et al. application above mentioned the kraut or other food product, which is to be packed, is fed from a hopper into a rotating feed worm which revolves in a nozzle whose mouth is adapted to be closed by a gate to permit a quantity of the foodstuff to be compacted in the nozzle. As the nozzle fills with the foodstuff the worm is forced rearwardly; and when the nozzle has been filled, a clutch is tripped to stop the rotation of the worm. The machine is provided with a rotatable head; and there are a plurality of measuring tubes mounted in this head. The head is rotatably indexible to bring these tubes successively into register with the nozzle. Upon completion of each indexing movement of the head the gate is swung up out of the way so that the foodstuff can be forced out of the nozzle into the mouth of that measuring tube, which has been newly indexed into filling position. Then suction is exerted in the bottom of this measuring tube so that the atmospheric pressure of the air behind the worm and the foodstuff will cause the worm, which is at this period stationary, to act like a piston and shove the kraut or other foodstuff into the measuring tube. Then the hopper is moved slightly away from the measuring tube carrying feed worm and the filling nozzle with it. The gate is then swung down to cause a knife blade, which it carries, to cut off the kraut or other foodstuff extending between the nozzle and the measuring tube. The head is then indexed to move the now-filled measuring tube into registry with an empty can which is carried into can-loading position by a conveyor belt. Simultaneously the indexing of the head moves another measuring tube into registry with the filling nozzle. During indexing of the head the filling nozzle is refilled with foodstuff. When the new measuring tube reaches the filling station the gate, as before, is swung up and foodstuff is forced out of the nozzle into this tube. While the new measuring tube is thus being filled at the filling station, the contents of the previously filled measuring tube, which is now at the can-loading station, are forced out of that tube into a can by air pressure exerted on the bottom of that tube. A steam jacket surrounds the filling nozzle and as the nozzle fills up with foodstuff, steam is injected from this jacket into the foodstuff to heat it and sterilize it.

While the machine of the prior application above mentioned is a vast improvement over prior types of filling machines for sauerkraut and similar foodstuffs, there are times when the feed worm tends to mutilate the kraut. Then, too, the feed worm does not always pack the kraut into the filler tube to the desired density. Moreover, the steam jacket around the feed worm does not always make it possible to heat the kraut or other foodstuff to the desired degree. Furthermore, both the worm-feeder and hopper are mounted on the carriage so that the whole weight of both have to be moved when the carriage is moved from or to filling position. This limits the speed at which the machine can be operated. One object of the present invention is to provide a machine of the character described having improved means for feeding the kraut or other foodstuff into the filling nozzle, means which will eliminate any possibility of mutilating the foodstuff.

Another object of the invention is to provide a machine of the character described having means for pocking the foodstuff in the filling nozzle to a desired density and in a manner more satisfactory to the trade.

Another object of the invention is to provide a machine of the character described in which the kraut or other foodstuff will automatically be fed in desired quantities to the hopper in time with feed of the foodstuff therefrom.

Still another object of the invention is to provide a machine of the character described in which improved means is provided for heating and sterilizing the foodstuff before canning it.

A still further object of the invention is to provide a machine of the character described which can be operated at a faster speed without shock or vibration.

Other objects of the invention will be apparent hereinafter from the specification and from the recital of the appended claims.

In the drawings:

Fig. 2 is a side elevation on an enlarged scale showing the mechanism for conveying the kraut to the hopper of the machine;

Fig. 3 is a section on the line 3—3 of Fig. 2 looking in the direction of the arrows and showing particularly the structure of the hot brine tank through which the kraut is conveyed on its way to the hopper;

Fig. 4 is a plan view of the parts shown in Fig. 2;

Fig. 5 is an enlarged end elevational view of the gate and cut-off mechanism of the machine, looking at it from one end;

Fig. 6 is a fragmentary plan view illustrating more particularly the mechanism for operating the gate and showing the indexible head of the machine with one of the measuring tubes indexed into filling position;

Fig. 7 is a fragmentary side elevation showing the feed carriage of the machine and the parts carried thereby;

Fig. 8 is a plan view of this carriage;

Fig. 9 is a longitudinal vertical section of this carriage taken on the line 9—9 of Fig. 8 looking in the direction of the arrows;

Figure 1:
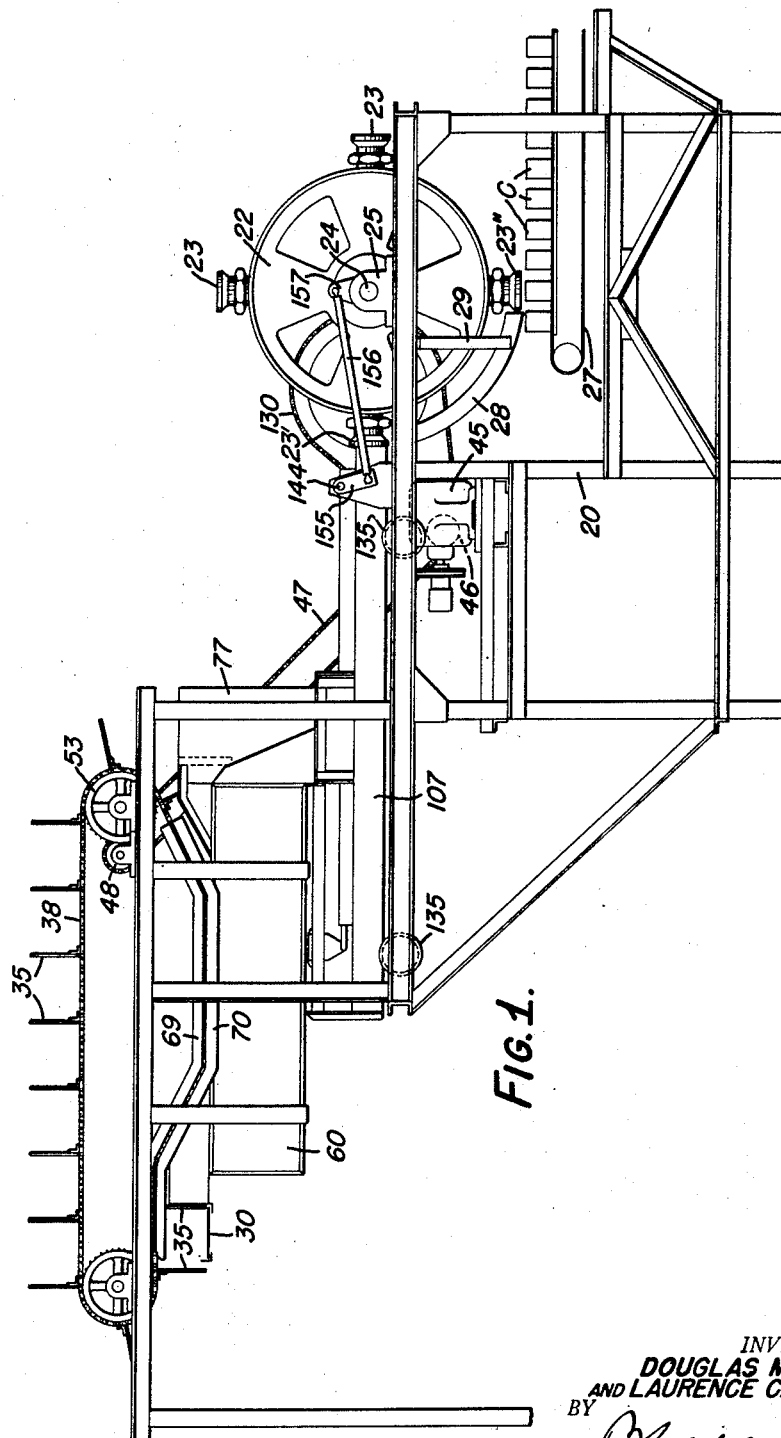
Fig. 1 is a side elevation of an improved can-filling machine constructed according to one embodiment of this invention, certain parts of the machine which are common to the machine of prior application No. 74,594 above mentioned being omitted for the sake of clearness in illustration.

Referring now to the drawings in detail, 20 denotes the base or frame of the machine which is of fabricated steel construction. Rotatably mounted on the frame 20 is a rotary head or drum 22 which carries four equiangularly spaced measuring tubes whose mouth-pieces are denoted at 23. The drum is secured to a shaft 24 which is journaled in pollow-blocks 25 that are secured to the frame 20.

The drum forms no part of the present invention and may be constructed the same way as the drum disclosed in prior application Serial No. 74,594 above mentioned. Suffice it to say that the drum is adapted to be indexed step by step about its axis of rotation to move successive measuring tubes successively from a filling station at which each tube is successively filled with foodstuff to a can-loading station at which the tubes are successively discharged into cans C carried by an endless conveyor 27. The foodstuff may be drawn into the measuring tubes at the filling station by suction and pushed out of the measuring tubes at the can-loading station by air pressure, through means such as described in application Serial No. 74,594 above mentioned.

In Fig. 1, the measuring tube, whose mouth piece is denoted at 23', is shown at the filling station and the measuring tube, whose mouth piece is denoted at 23"

is shown at the can-loading station. During movement of a measuring tube from the filling station to the can-loading station, the mouth piece of the measuring tube rides in an arcuate channel member 28 which is shaped to fit the mouth piece closely so that the contents of the measuring tube are prevented from dropping out of the tube until the tube reaches can-loading position. The channel member 28 is secured to the frame by a strap 29 and by welding. This structure may also be the same as illustrated in application No. 74,594 and forms no part of the present invention.

The kraut or other foodstuff to be loaded is delivered to the machine by an endless belt 30 (Figs. 1, 2 and 4) which may travel from the storage vat in which the kraut is stored to the machine. This belt may be loaded manually by tossing the kraut on it, or it may be disposed under an outlet in the vat so that the kraut will be deposited directly on it as it travels under this outlet. The belt 30 travels between opposed parallel angle-iron side rails 31 and 32.

The kraut is adapted to be raked off of the belt 30 by three-tined rakes whose tines are denoted at 35. These rakes are secured to bars (Fig. 3) which are fastened at opposite ends to the linearly spaced links of two parallel endless chains 38. These chains travel over two pairs of sprockets 39, one pair of sprockets being secured in axially spaced relation to a shaft 40 and the other pair of sprockets being secured in corresponding axially spaced relation to a shaft 41. The shaft 40 is journaled in pillow blocks 42 which are secured to the frame of the machine; and the shaft 41 is journaled in pillow blocks 43 which are also secured to the frame of the machine.

Shaft 41 is driven from a motor 45 (Fig. 1) through an angular drive (not shown), a pulley 46, belt 47, and a pulley 48 (Fig. 4). The pulley 48 is secured to a shaft 49 which is parallel to shaft 41 and which is journaled in pillow blocks 50 that are secured to frame 20. Fastened to shaft 49 is a spur pinion 52 which meshes with a spur gear 53 that is secured to sprocket shaft 41. Shaft 49 carries a conventional single-revolution clutch 76 (Fig. 10) which permits the shaft 49 to make alternately one revolution and then disengages the drive to the shaft again. Thus, shaft 49 rotates only intermittently and drives shaft 41 only intermittently. The operation of the single-revolution clutch is timed to the other feeding operation of the machine as will be described hereinafter so that kraut is removed from belt 30 only in quantities that can be handled by the machine.

Mounted beneath the lower reaches of the feed conveyor chains 38 is a hot brine tank 60 (Figs. 2 and 3). This is supported from the framework 20 of the machine by straps 61. Mounted within this tank is a trough 62 which has a perforated bottom plate 63. This plate has a portion 65 sloping downwardly from the left hand upper edge of the tank, as viewed in Fig. 2, a portion 66 which is horizontal and parallel to the bottom of the tank, and a portion 67 which slopes upwardly from portion 66 to the upper right hand end of the tank. Portion 66 of the perforated plate 62 lies about half way of the depth of the tank 60.

The brine in the tank is kept approximately at a level denoted at L and at a temperature of 210° to 212°.

The conveyor chains 38 travel at right angles to the direction of travel of belt 30; and each conveyor chain 38 is mounted to travel in a guide channel 68 formed between upper and lower rails 69 and 70 that are secured to the frame of the machine. Thus, as the sprockets 39 revolve, the conveyer chains 38 carry the successive rakes 35 successively across the supply belt 30 to rake the kraut or other foodstuff off of that belt into a trough 75 that is secured to the top of the hot brine tank 60 at the upper left hand side thereof. Parallel openings are provided in siderails 31 and 32 so that the rakes 35 can traverse belt 30.

The trough 75 is open at its bottom within tank 60 and communicates at its bottom with the trough or channel member 62. The rakes 35 convey the kraut through trough 62 and through the hot brine that enters that trough through its perforated bottom 63. Thus the kraut is carried down the inclined portion 65 (Fig. 2) of trough-bottom 63 into the brine, is carried along the bottom portion 66 of the trough bottom in the brine, and is then carried up the inclined portion 67 of the trough bottom out of the brine tank 60 into a hopper 77. In its passage through the hot brine the kraut or other foodstuff is heated to the desired degree and sterilized.

The hopper 77 is secured to the frame 20 of the machine. It may be shaped as shown in Fig. 2 with its left hand wall converging toward its right hand vertical wall. Its lower end seats in the open upper end of a receptacle 78 which is integral with a tube 80. The receptacle 78 has an opening 81 in its right-hand bottom portion through which the kraut or other foodstuff may pass from the receptacle into the tube 80. The tube 80 is tapered at its right hand end and has secured to its right hand end a filling nozzle 83. A steam jacket 85 surrounds the tube 80. Steam may be supplied to this jacket through connection 86 and exhausted therefrom through connection 87, so as to keep the kraut, or other foodstuff in the tube hot.

The right hand end of the nozzle 83 is adapted to be closed by a swingable gate member 88 (Figs. 5, 8 and 9). This gate member has a knife-blade 98 fastened to its lower edge; and it is secured by screws 89 to a block 90 that is fastened to the head of a shaft 91. This shaft is journaled in a supporting block 92 which is clamped by means of yoke member 93 and screws 94 about the nozzle 83. When the gate is down, the kraut is compacted against the gate in the tube 80 by the head 95 of a piston 96 which reciprocates in a cylinder 97. The piston head 95 is of a diameter to enter the tube 80; and it has an arcuate shroud 98 secured to it which extends to the left far enough to prevent kraut from dropping behind the piston head in the rightward stroke of the piston head.

The direction of travel of the piston 96 is controlled by a conventional reciprocating valve 100 (Fig. 10) which may be shifted by a solenoid 190 (Fig. 11) which is controlled by a relay 102. The valve 100 is connected by ducts 110 and 113 at opposite ends of cylinder 97 with opposite sides of piston 96. Compressed air is supplied to this valve from any suitable source through a line 112; and it may be exhausted from this valve through opening 111 or opening 114 indicated diagrammatically in Fig. 10.

Secured to piston head 95 is a rod 104 (Figs. 7, 8, 9 and 10) which is fastened at its left hand end to a reciprocable control member 105. This control member is mounted to reciprocate on a bar 106 which is secured at opposite ends in a carriage 107 that is reciprocable on the frame of the machine.

The control member 105 is adapted to engage and trip limit switches 108 and 109 at opposite ends of its travel. These limit switches are secured to the carriage 107 and are connected electrically, as will be described further hereinafter, to the relay 102. The limit switch 109 is a normally open switch; and the limit switch 108 is a normally closed switch.

When the control member 105 contacts the limit switch 109 the relay 102 is energized to shift valve 100 in a direction to put duct 110, which leads to the right hand side of the cylinder 97, on supply, and to put the duct 113, which leads from the left hand end of cylinder 97, on exhaust. The piston head 95 will therefore be moved to the left to permit a charge of kraut to drop from the hopper 77 through the opening 81 in the bottom of receptacle 78 into tube 80.

As soon as the control member 105 contacts the limit switch 108, the relay 102 will be de-energized to cause the valve 100 which may be spring-loaded, to be reversed, thus putting duct 113 on supply and duct 110 on exhaust. This will cause the piston head 95 to travel to the right to force the newly fed kraut into the tube 80.

The piston head 95 will thus travel back and forth between the limits controlled by the limit switches 109 and 108 until the kraut compacted in the tube 80 has built back from the gate 88 in the tube 80 to the point where the piston 96 cannot complete its stroke to the right and limit switch 109 cannot therefore be tripped by member 105. Then the piston will stall since the compressed air acting on the piston has a predetermined controlled pressure as delivered from supply line 112. Hence, the kraut cannot be compacted beyond a predetermined degree. This method of operation permits the kraut to be compacted in the tube 80 to a desired density which is an advantage much sought by the trade.

Figure 10:
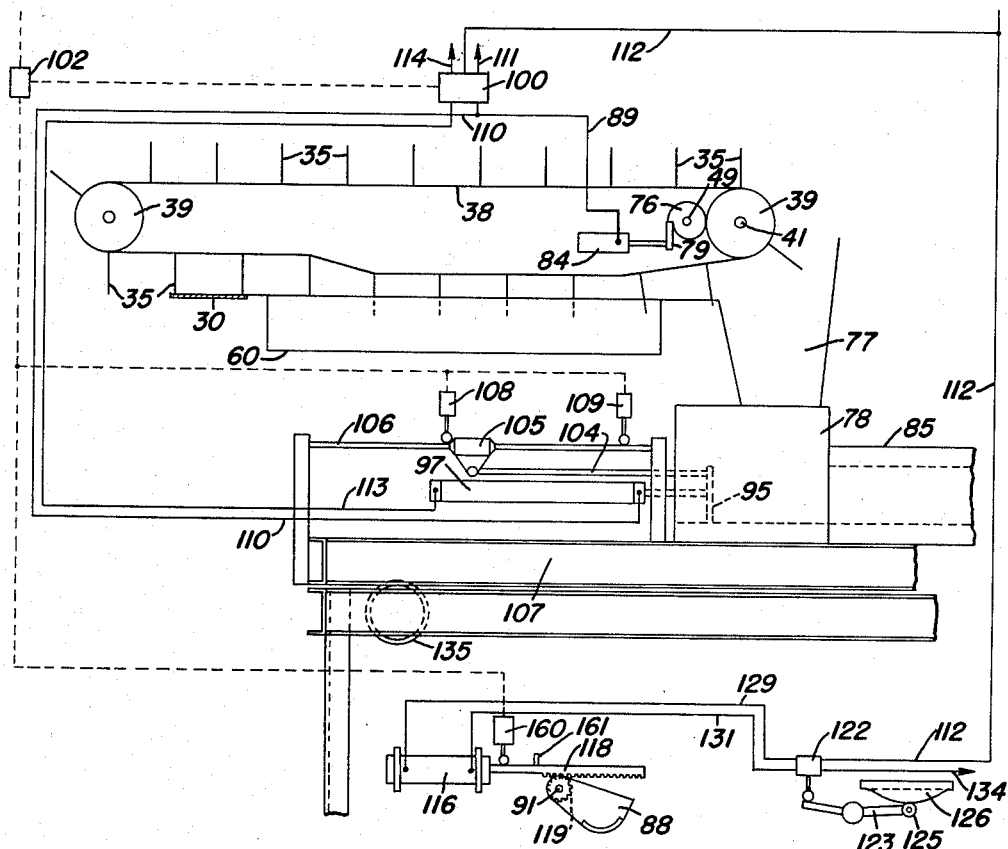
Fig. 10 is a diagrammatic view illustrating particularly the electrical and the pneumatic circuits of the machine.

The gate 88 is pneumatically operated by means of a piston (not shown) which reciprocates in a cylinder 116 (Figs. 10 and 8). This piston is connected by means of a pin 117 to a rack bar 118 which meshes with a pinion 119 that is fastened to the shaft 91, to which the gate 88 is secured. Cylinder 116 is supported from the framework of the machine by a bracket 115.

The reciprocation of the piston in the cylinder 116 is controlled by a conventional four way valve 122 (Figs. 6 and 10). The valve 122 is connected with one end of cylinder 116 by duct 129; and it is connected with the opposite end of this cylinder by duct 131 (Fig. 10). This valve is also connected with air pressure supply duct 112; and it has an exhaust opening 134. The valve is shifted by a lever 123. This lever is pivoted at 124 on the frame of the machine. It engages at one end with the stem of valve 122; and it carries a roller 125 at its opposite end which engages a cam 126. This cam is secured to a shaft 127 that is journaled in pillow blocks 128 on the frame of the machine.

The shaft 127 is driven from the motor 45 (Fig. 1) through sprocket wheels and a chain 130. Like the shaft 216 of the machine disclosed in application Serial No. 74,594 above mentioned it drives the head 22; it operates the valves which control air-pressure and suction on the measuring tubes which are at can-loading and filling positions, respectively, and it controls connection of the head with the air supply and air exhaust lines for these tubes. Thus, shaft 127 carries a conventional driver 132 (Fig. 6) which operates a conventional Geneva wheel 133 to index periodically the head or drum 22. The Geneva wheel 133 is secured to the shaft 24 to which the head or drum 22 is secured. This structure is like that illustrated in application No. 74,594 above mentioned.

The carriage 107, as previously stated, is reciprocable on the frame 20. For this purpose it is provided with side rails 138 that slide upon rollers 135 (Figs. 1, 5, 7, 8 and 9) which are secured to spaced shafts 136 and 137 that are parallel to one another and that are journaled in the framework 20 of the machine.

The movement of the carriage is effected by operation of a cam 140 (Fig. 6) which may be integral with face cam 126. A roller or follower 141 engages the periphery of the cam 140. This roller or follower is carried by a rod 142 which is connected through a crank arm 143 with a shaft 144. The shaft 144 (Fig. 5) is journaled at opposite ends in the framework 20 and has two axially-spaced arms 145 secured to it which are forked at their lower ends (Fig. 9) to engage over pins 146 that are secured in the carriage 107. When the crank arm 143 is rocked, therefore, in either direction shaft 144 will be rocked to rock arms 145 and move carriage 107 in one direction or the other depending on the direction of movement of crank arm 143. The cam 140 is so formed that in a revolution of shaft 127 it effects through crank arm 143, shaft 144, and arms 145 a reciprocation of the carriage 107 to move nozzle 83 out of engagement with the mouth 23 of one measuring tube of head 22 and return it into engagement with the mouth of the measuring tube which is newly indexed into filling position, nozzle 83 being thus withdrawn during indexing of the head 22.

The shaft 127 also carries the cam 150 (Fig. 6) which controls through a follower 151 and rods 152 and 152 the valves (not shown) which control suction and pressure on the measuring tubes. This construction forms no part of the present invention and may be the same as disclosed in application No. 74,594 referred to above. A commutator (not shown), which connects the pressure and exhaust lines with the head or drum 22 is operated from the shaft 144 through the arm 155 (Fig. 1), rod 156 which is connected to arm 155, and arm 157 which is rockably mounted upon shaft 24 and which is connected with the commutator. The structure forms no part of the present invention and may be the same as in application No. 74,594 referred above.

After the tube 82 has been filled, the gate 88 is swung up out of the way, and the nozzle 83 is brought into engagement with the mouth 23 of this measuring tube, which is at the filling station, by movement of carriage 107 to the right. Then the pressure of air on the piston 96 and the suction in the bottom of the measuring tube cause the piston head 95 to move to the right and shove the kraut out of the supply tube 82 into the measuring tube.

A limit switch 160 (Figs. 5 and 10) is incorporated in the control circuit of the valve 100 so that the piston head 95 cannot return to the left for another charge of kraut if the gate 88 is in the vertical, that is, open position.

The limit switch 160 is a normally-closed switch. When the rack-bar 118 is moved to the left to open gate 88, the lug 161 (Figs. 5 and 11), which is carried by the rack-bar 118, engages switch 160 opening that switch, breaking the circuit to the solenoid which operates valve 100 (Fig. 10). Thus, even though limit switch 109 be closed by control member 105 in the movement of piston head 95 to the right forcing the kraut or other foodstuff into the measuring tube which is at the filling station, the solenoid will not be energized to shift the valve 100 and put duct 110 on supply. Hence piston 96 will remain at the right, and cannot move to the left until the gate 88 has been closed again by operation of cam 126.

As previously stated, chain 38 is moved intermittently step-by-step so that the rakes 35 push charges of foodstuff off conveyor belt 30 only just as fast as those charges are used up in the feeding mechanism of the machine. To effect step by step movement of the kraut from the supply belt 30 into the trough 75, a single revolution clutch 76 is secured, as previously stated, to shaft 49 (Fig. 10). This clutch is locked by a dog 79, which is spring-actuated into locking engagement with the peripheral cam surface of the clutch member 76 to prevent rotation of shaft 49; and which is moved out of locking position by air pressure. The dog 79 is secured to a piston that reciprocates in a cylinder 84 which is connected by duct 89 with the valve 100. When piston head 95 moves to the left, the right hand end of cylinder 84 is put on supply; and dog 79 is moved by air pressure to release clutch 76; and permit shaft 49 to drive chains 38 a step, to move a new charge of foodstuff off belt 30 into trough 62, and move a new charge of foodstuff out of trough 62 into hopper 77. The rotation of shaft 49 continues until dog 79 locks the shaft 49 up again which occurs after a revolution of the shaft. The clutch plate 76 needs only momentary release to engage the clutch. When air duct 113 is put on supply and air duct 110 is put on exhaust to move piston head 95 to the right again, air duct 89 is immediately put on exhaust and the spring (not shown) in the left hand end of cylinder 84 returns the locking dog 79 to position to lock up clutch 76 after the shaft 49 has made, as stated, a revolution.

Figure 11:
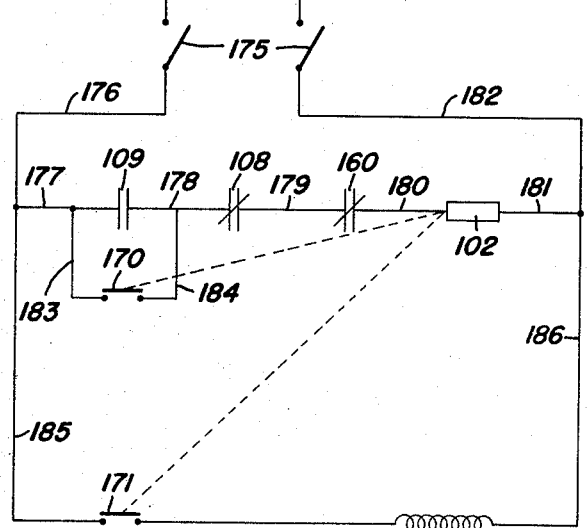
Fig. 11 is a further diagrammatic view further illustrating the electrical wiring.

One way in which the machine may be wired to effect its operations is disclosed in Figs. 10 and 11. The limit switch 109, as stated, is a normally open switch, and is adapted to be closed by the reciprocable control member 105. The limit switch 108 is a normally closed switch and is adapted to be opened by the control member 105. The limit switch 160 is a normally closed switch and is adapted to be opened by rack bar 118 when the gate 88 is swung upward.

Current is supplied to the machine from the main lines L1 and L2 when the main line switch 175 is closed. When the limit switch 109 is closed by engagement therewith of control member 105, relay 102 is actuated and contacts 170 and 171 of this relay are closed, a circuit being made from main line L1 through line 176, line 177, limit switch 109, line 178, limit switch 108, line 179, limit switch 160, line 180, relay 102, line 181, and line 182 back to main line L2. The closing of contact member 171 energizes solenoid 190 which shifts valve 100 causing reversal of the piston head 95. The closed contact 170 maintains the circuit to the relay, despite the opening of limit switch 109 on return of piston head 95 to the left, until the control member 105 strikes and opens limit switch 108, the circuit to the relay being maintained from main line L1, through lines 176, 177 and 183, contact 170, lines 184 and 178, limit switch 108, line 179, limit switch 160, line 180, relay 102 and lines 181 and 182 to main line L2. When the limit switch 108, is opened by control member 105, the circuit to relay 102 will be broken, contact 171 will drop out, and solenoid 190 will be de-energized. The spring will then shift valve 100, causing piston head 95 to move back to the right.

The operation of the machine will be understood from the preceding description but may be briefly summed up here.

When the gate 88 (Figs. 5, 9 and 10) is down and piston head 95 is moving to the right from the position shown in Figs. 9 and 10, the piston head will compact the foodstuff, that has dropped from hopper 77 through hole 81 into tube 80, into the nozzle 82 against the gate. While the described movement of piston head 95 is occurring, duct 89 will be on exhaust and detent 79 will prevent rotation of one revolution clutch 76.

When the control member 105 strikes the limit switch 109, the valve 100 will be reversed; the piston head 95 will return to the left; and the air-duct 89 will be put on supply to disengage dog 79 from clutch disc 76. This will permit shaft 49 to make a revolution, causing the sprockets 39 to advance the chains 38 a step. In this movement of the chains 38, one of the rakes 35 carried by the chains will sweep across belt 30 and sweep off that belt into trough 75 a charge of the kraut or other foodstuff which is being handled in the machine. At the same time other rakes 35 of the chains will advance previously delivered charges of the foodstuff progressively over the bottom of trough 63 through the steam tank 69 and one of these charges will be delivered into the hopper 77. When the shroud 98 clears port 81 in the leftward movement of the piston, another charge of foodstuff will drop from hopper 77 into tube 80.

When the control member 105 strikes the limit switch 108, the relay 102 will be actuated and solenoid 190 will be energized to reverse valve 100 again. The shaft 49 will be locked again against rotation. Simultaneously piston head 95 will again move to the right pushing and compacting a new charge of foodstuff into nozzle 82.

So the operation will proceed until so much foodstuff has been compacted into nozzle 82 that piston head 95 cannot move far enough to the right to trip limit switch 109 under the air pressure of the system. Then the reciprocation of the piston head will be stopped. The stoppage of the reciprocation of the piston head will also stop movement of charges of foodstuff off belt 30 and of charges of foodstuff into hopper 77.

The machine will be timed, similarly to the machine of application Serial No. 74,594 above mentioned, that when sufficient foodstuff has been compacted into nozzle 82 to fill a measuring tube, at least, cam 126 (Figs. 6 and 10) will rotate into a position to shift valve 122 and cause rack 118 to swing gate 88 upward. The cam 140 (Fig. 6) operating through follower 141, rod 142, arms 143, rod 144, arms 145 (Figs. 5 and 9) and pins 146 will then move carriage 107 to the right on rollers 135 to engage the nose 83 of nozzle 82 in the mouth 23 of that measuring tube which is at the filling station.

The bottom of this measuring tube is then on suction through operation of mechanism like that described in application No. 74,594 including cam 150 and the valves controlled thereby. The pressure of the atmospheric air behind piston head 95 and the suction in the measuring tube hence forces the foodstuff out of nozzle 82 into the measuring tube.

When the piston head 95 has moved far enough to the right the control member 105 trips limit switch 109 and the piston head resumes its reciprocatory movement to recharge the nozzle 82. The cam 140 will by this time have rotated far enough for carriage 107 to be withdrawn; and the nose 83 of the nozzle will thereby be withdrawn from engagement with the measuring tube.

Immediately thereafter cam 126 will have rotated far enough for valve 122 to be reversed causing gate 88 to be swung down causing the knife blade 98, which it carries, to sever the strands of foodstuff remaining between the nozzle and the measuring tube. Limit switch 160 will insure that piston head 95 cannot resume its reciprocation until the gate 88 has been closed.

The suction in the bottom of the measuring tube, which is at the filling station, will then be shut-off through mechanism such as described in application No. 74,594. Then one of the pins carried by driver 132 (Fig. 6) will rotate into engagement with one of the slots of the Geneva wheel 133; and the drum 22 will be indexed a quarter of a revolution. This will bring a new, empty measuring tube to the filling station and move the previously-filled measuring tube to the can-loading station.

The operation of filling the nozzle and the ensuing steps proceed as before. When the gate 88 is opened to permit filling the measuring tube which is at the filling station, the previously-filled measuring tube, which is now at the can-loading station, is emptied into can C (Fig. 6) by air-pressure on its bottom through the means described in application No. 74,594.

The word "can," as used in this application, is employed in a generic sense to include jars and other containers.

While the invention has been described in connection with a particular embodiment thereof, it is capable of various modifications and uses, and this application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A machine for packing foodstuffs into cans comprising a filling tube, a hopper communicating with said tube adjacent one end thereof, a movable gate for closing the other end of said tube, a member reciprocable axially in said tube to feed foodstuff from said hopper forward in said tube and compact the foodstuff against said gate, fluid-pressure operated means for effecting forward and return strokes of said reciprocable member, a reversing valve controlling the direction of movement of said reciprocable member, front and rear trip members operable by said reciprocable member at opposite ends, respectively, of its stroke, for reversing said reversing valve, said front trip member being positioned so that when a predetermined quantity of foodstuff has been compacted in said tube the foodstuff will prevent said reciprocable member from completing its forward stroke thereby preventing tripping of said front trip member, and thereby stopping reciprocation of said reciprocable member, and means for periodically opening said gate to permit said reciprocable member to complete its forward stroke, thereby to force the compacted foodstuff out of said tube and to trip said forward trip member.

2. A machine for packing foodstuffs into cans comprising a filling tube, a hopper communicating with said tube adjacent one end thereof, a movable gate for closing the other end of said tube, a member reciprocable axially in said tube to feed foodstuff from said hopper forward in said tube and compact the foodstuff against said gate, fluid-pressure operated means for effecting forward and return strokes of said reciprocable member, a reversing valve controlling the direction of movement of said reciprocable member, front and rear trip members operable by said reciprocable member at opposite ends, respectively, of its stroke, for reversing said reversing valve, said front trip member being positioned so that when a predetermined quantity of foodstuff has been compacted in said tube the foodstuff will prevent said reciprocable member from completing its forward stroke thereby preventing tripping of said front trip member, and thereby stopping reciprocation of said reciprocable member, and means for periodically opening said gate to permit said reciprocable member to complete its forward stroke, thereby to force the compacted foodstuff out of said tube and to trip said forward trip member, and means preventing said reciprocating member from reciprocating while said gate is open.

3. A machine for packing foodstuffs into cans comprising a filling tube, a hopper communicating with said tube adjacent one end thereof, a movable gate for closing the other end of said tube, a member reciprocable axially in said tube to feed foodstuff from said hopper forward in said tube and compact the foodstuff against said gate, fluid-pressure operated means for effecting forward and return strokes of said reciprocable member, a solenoid-operated reversing valve controlling the direction of movement of said reciprocable member, a control member connected to said reciprocable member to reciprocate therewith, a pair of electrical limit switches adapted to be engaged and tripped by said control member at opposite ends, respectively, of the stroke of said control member to operate said solenoid to reverse said reversing valve, one of said limit switches being so positioned that when a predetermined quantity of foodstuff has been compacted in said tube, the foodstuff will stop movement of said reciprocable member in one direction before the control member can trip said one limit switch, and means for periodically opening said gate to permit said reciprocable member to complete its stroke in said one direction, thereby to force the compacted foodstuff out of said tube and to trip said one limit switch.

4. A machine for packing foodstuffs into cans comprising a filling tube, a hopper communicating with said tube adjacent one end thereof, a movable gate for closing the other end of said tube, a member reciprocable axially in said tube to feed foodstuff from said hopper forward in said tube and compact the foodstuff against said gate, fluid-pressure operated means for effecting forward and return strokes of said reciprocable member, a solenoid-operated reversing valve controlling the direction of movement of said reciprocable member, a control member connected to said reciprocable member to reciprocate therewith, a pair of electrical limit switches adapted to be engaged and tripped by said control member at opposite ends, respectively, of the stroke of said control member to operate said solenoid to reverse said reversing valve, one of said limit switches being so positioned that when a predetermined quantity of foodstuff has been compacted in said tube, the foodstuff will stop movement of said reciprocable member in one direction before the control member can trip said one limit switch, and means for periodically opening said gate to permit said reciprocable member to complete its stroke in said one direction, thereby to force the compacted foodstuff out of said tube and to trip said one limit switch, and an electrical limit switch operatively connected to said gate and wired in the electrical circuit to said solenoid to prevent operation of said solenoid when said gate is open.

5. A machine for packing foodstuff into cans comprising a filling tube having a receiving opening and a delivery opening therein, a hopper communicating with said delivery opening, a movable gate for closing said delivery opening, a member reciprocable forward and back axially in said tube to feed foodstuff from said receiving opening forward toward said delivery opening and to compact foodstuff against said gate, means effecting reciprocation of said reciprocable member, a pair of limit members determining the stroke in opposite directions of said reciprocable member and operable by said reciprocable member at opposite ends of the stroke of said reciprocable member to reverse said stroke, one of said limit members being positioned so that when a predetermined quantity of foodstuff has been compacted to a predetermined degree against said gate said one limit member is beyond the forward stroke of said reciprocable member so that it cannot be operated by said reciprocable member, and means for opening said gate to permit said reciprocable member to complete its forward stroke thereby to force foodstuff out of said delivery opening and to operate said one limit member.

6. A machine for packing foodstuff into cans comprising a filling tube having an opening therein on its top adjacent one end thereof, a hopper mounted above said tube and communicating with said opening, a movable gate for closing the other end of said tube, a member reciprocable axially in said tube to feed foodstuff forward in said tube from said opening and to compact said foodstuff against said gate, fluid-pressure operated means including a cylinder and a piston reciprocable therein for reciprocating said reciprocable member, said piston having a piston-rod secured thereto to one end of which said reciprocable member is secured, a shroud secured to said reciprocable member and covering said piston rod to prevent foodstuff falling from said hopper and getting behind said reciprocable member, a reversing valve controlling the direction of movement of the piston in the cylinder, front and rear trip members spaced axially of said tube and operable to reverse said valve, a guide bar, a control member for tripping alternately said trip members, said control member being slidable on said guide bar and being connected to said reciprocable member to reciprocate therewith, said front trip member being positioned to permit said reciprocable member to compact a predetermined amount of foodstuff in said tube before said front trip member is beyond the reach of the control member in its forward movement with said reciprocable member, and means for periodically opening said gate to allow said reciprocable member to complete its stroke, thereby forcing foodstuff out of said tube and tripping said front trip member.

7. The combination with a machine for packing foodstuffs into cans, of a continuously operating conveyor belt for delivering foodstuff to said machine, said machine comprising a hopper, a filling tube communicating with said hopper and adapted to receive foodstuff from said hopper, means operative intermittently to force foodstuff out of said filling tube when the tube holds at least a charge of the foodstuff, an endless belt disposed transversely of said conveyor belt and having a plurality of rakes spaced therealong, a sterilizing tank beneath said endless belt, and means actuated in time with said forcing means for intermittently driving said endless belt to cause said rakes to move intermittently charges of foodstuff off the first-named belt and through said tank into said hopper.

8. The combination with a machine for packing foodstuff into cans, of a continuously operating conveyor belt for delivering foodstuff in bulk to said machine, a hopper, an endless belt disposed transversely of said conveyor belt and having a plurality of rakes spaced therealong, a sterilizing tank disposed between said conveyor belt and said hopper in the path of travel of said endless belt, and means for intermittently actuating said endless belt to rake charges of foodstuff off said conveyor belt into said sterilizing tank, and to move said charges step-by-step through said sterilizing tank to said hopper.

9. The combination with a machine for packing foodstuff into cans, of an elongated sterilizing unit, a hopper, a filling tube in said machine communicating with said hopper and adapted to receive foodstuff from said hopper, means for compacting foodstuff in said filling tube, means in said machine operative intermittently to force a charge of foodstuff out of said filling tube after at least a predetermined amount of said foodstuff has been compacted in said tube, means for delivering foodstuff in bulk to said sterilizing unit, and means actuated in time with the forcing means for conveying charges of the foodstuff in bulk step-by-step through said sterilizing unit to said hopper.

10. In a machine for packing foodstuff into cans, the combination with an indexible head having a plurality of containers mounted therein, and means for indexing the head intermittently to move the containers successively from a filling station to an unloading station, of a filling nozzle for feeding stock into the containers, a carriage on which the nozzle is mounted, a frame for supporting said carriage and on which the carriage is reciprocable, means for reciprocating said carriage to move the nozzle into engagement with a container when the container is indexed to the filling station and for withdrawing the nozzle from the container when the filling operation is completed, a hopper for the stock mounted on the frame to communicate with said nozzle when the nozzle is in its withdrawn position, and means for feeding foodstuff forward in said nozzle to the mouth thereof.

11. The combination with a machine for packing foodstuff into cans, of a continuously running conveyor for delivering foodstuff to said machine, an endless belt disposed transversely of said conveyor, and a sterilizing tank beneath said endless belt, said endless belt having a plurality of rakes spaced therealong for moving foodstuff off said conveyor through said sterilizing tank, said machine having a hopper disposed to receive foodstuff from said sterilizing tank, a filling tube communicating with said hopper, reciprocable means for feeding foodstuff forward in said filling tube from said hopper to the mouth of said tube, means for effecting forward and return strokes of said reciprocable means, and means operable on the strokes of said reciprocable means in one direction to drive said endless belt intermittently thereby to cause the rakes to feed charges of the foodstuff step-by-step through said sterilizing tank to said hopper.

12. The combination with a machine for packing foodstuff into cans, of a continuously running conveyor for delivering foodstuff to said machine, an endless belt disposed transversely of said conveyor, an elongated tank adapted to be filled with a hot liquid, and a trough mounted within the walls of said tank and having a perforated bottom through which the liquid may enter said trough, said endless belt having a plurality of rakes spaced therealong for moving foodstuff off said conveyor through said trough, said machine having a hopper disposed to receive foodstuff from said trough, a filling tube disposed beneath and communicating with said hopper, a movable gate for closing the mouth of said filling tube, a member reciprocable in said filling tube to move foodstuff, which is received in said tube from said hopper, forward in said tube and to compact said foodstuff against said gate, fluid-pressure operated means for reciprocating said reciprocable member, means for driving said endless belt, and fluid-pressure operated means for connecting said drive means to said endless belt during the strokes of said reciprocable member in one direction and for disconnecting said drive means from said endless belt during the strokes of said reciprocable member in the opposite direction, said two fluid-pressure operated means being connected together.

13. The combination with a machine for packing foodstuff into cans, of a continuously running conveyor for delivering foodstuff to said machine, and an endless belt disposed transversely of said conveyor, said endless belt having a plurality of rakes spaced therealong for moving foodstuff off said conveyor, said machine having a hopper disposed to receive foodstuff moved off the conveyor by the rakes of said endless belt, a filling tube disposed beneath and communicating with said hopper, a movable gate for closing the mouth of said filling tube, a member reciprocable in said filling tube to move foodstuff, which is received in said tube from said hopper, forward in said tube and to compact said foodstuff against said gate, fluid-pressure operated means for reciprocating said reciprocable member, said fluid-pressure operated means being constructed so that the reciprocation of said reciprocable member ceases with the forward stroke of said member incomplete when a predetermined amount of foodstuff has been compacted in said filling tube, means for periodically opening said gate to permit said reciprocable member to complete its forward stroke and force foodstuff out of said tube, means operable on closing of said gate again to cause said fluid-pressure operated means to become fully operative again and thereby to cause said reciprocable member to resume its reciprocating motion, means for driving said endless belt, fluid-pressure operated means for connecting said drive means to said endless belt during stroke of said reciprocable member in one direction, and for disconnecting said drive means from said endless belt during stroke of said reciprocable member in the opposite direction, and a single reversing valve for controlling both said fluid-pressure operated means, said reversing valve being connected to said reciprocable member to be operated thereby.

References Cited in the file of this patent

UNITED STATES PATENTS

| Number | Name | Date |
|---|---|---|
| 2,319,561 | Scharsch | May 18, 1943 |
| 2,337,406 | Opie | Dec. 21, 1943 |
| 2,352,863 | Robinson | July 4, 1944 |
| 2,353,005 | Behrent et al. | July 4, 1944 |

FOREIGN PATENTS

| Number | Country | Date |
|---|---|---|
| 320,116 | Great Britain | Oct. 7, 1929 |